June 11, 1968  J. JONAS ET AL  3,387,824
INTERDICTION DEVICE
Filed March 3, 1967
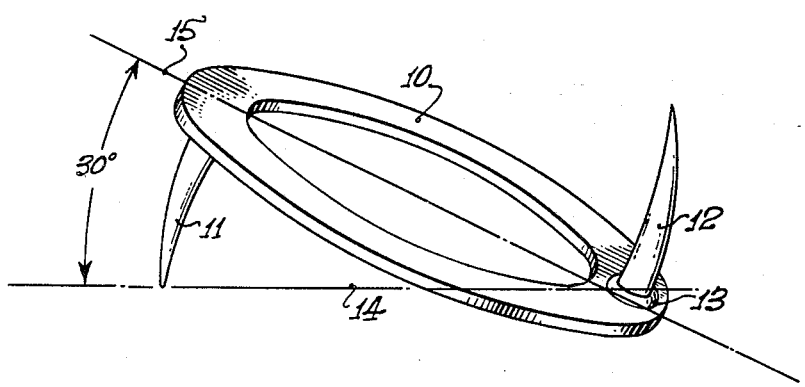
INVENTORS.
JULIUS JONAS,
FRANK X. PFENNEBERGER,
By L.E. Carnahan
AGENT 3,387,824
INTERDICTION DEVICE
Julius Jonas, Claremont, and Frank X. Pfenneberger,
Pomona, Calif., assignors to General Dynamics Corporation, a corporation of Delaware
Filed Mar. 3, 1967, Ser. No. 620,477
1 Claim. (Cl. 256—1)

ABSTRACT OF THE DISCLOSURE

This disclosure is directed to an air-droppable, caltrop-type or interdiction device which comprises a flat ring member having two prongs secured at diametrically opposed points on the opposite sides of said ring and extending perpendicularly to the plane thereof.

Background of the invention

A caltrop, as known in the art, has a four-pointed body, the points being so arranged that when any three of them are on the ground, the fourth sticks straight up from the ground surface and is effective for use against animals, ground personnel or vehicles equipped with pneumatic tires.

Summary of the invention

This invention relates to a caltrop-type or interdiction device which is effective against animals or ground personnel, for example, when air dropped on soft soil. The instant device has the attribute of falling point up as does a caltrop while exhibiting a far greater capability of performing the caltrop function on soft soil and also exhibiting a better capability of penetrating overhead vegetation during air drop.

Therefore, it is an object of this invention to provide a caltrop-type device.

A further object of the invention is to provide a caltrop-type device which is effective on soft soil.

Another object of the invention is to provide a caltrop-type device which is effective in the ability of penetrating overhead vegetation during air drop.

Another object of the invention is to provide a caltrop-type device which is effective when air dropped on soft soil.

Other objects of the invention will become readily apparent from the following description and accompanying drawing wherein:

Brief description of the drawing

The single figure is a perspective view of an embodiment of the invention.

Description of the invention

The embodiment of the invention illustrated in the drawing is an air-droppable, caltrop-type or interdiction device comprising a flat ring member 10 having two pointed prongs 11 and 12 secured to said ring member 10 at diametrically opposed points on the opposite sides of said ring member and extending perpendicularly to the plane of the ring member 10. The prongs 11 and 12 are secured to the ring member 10 by welding or the like as indicated at 13. However, the prongs may be formed integral with the ring member. Each of the prongs 11 and 12 are slightly curved toward the center of ring member 10 as shown, so as to more readily enter the foot of ground personnel, for example, and inflict a wound which will render the personnel incapable of further activity. The device is constructed such that a plane indicated at 14 intersects the point of prong 11 and the base of prong 12 and forms a 30° angle with respect to the plane 15 of the ring member 10, as shown in the drawing. A similar plane extends from the point of prong 12 to the base of prong 11 and forms a similar angle with the plane 14 of the ring member.

The operation of the present device functions similar to a caltrop in that one of the prongs 11 or 12 will point upwardly when dropped, thus producing an effective deterrent against undesired movement of animals, personnel or certain types of vehicles. Due to the construction of the inventive device, it is capable of providing the desired effects when dropped in soft soil and also providing better capability of penetrating overhead vegetation during air drop.

It is thus seen that the present invention provides an improved caltrop-like device which exhibits capabilities not provided by the known devices.

Although a particular embodiment of the invention has been illustrated and described, modifications will become apparent to those skilled in the art, and it is intended to cover in the appended claim all such modifications as come within the true spirit and scope of the invention.

What we claim is:

1. An interdiction device comprising a flat substantially circular body member, said circular body member having a central aperture thus defining a flat ring-like configuration; and a pair of prong-like members secured to said body member and extending perpendicularly with respect to the plane of said body member, said prong-like members being located at diametrically opposed points on opposite sides of said body member, said prong-like members being pointed at the outer end thereof, each of said prong-like members being slightly curved such that said outer end thereof extends in the direction of the oppositely located prong-like member, said prong-like members being so configured such that an angle of about 30° is formed between the plane of said body member and a plane which extends from the outer end of one of said prong-like members to the base of said opposite prong-like member.

References Cited

UNITED STATES PATENTS

| 1,094,226 | 4/1914 | Le Duc | 256—1 X |
| 2,346,713 | 4/1944 | Walker | 256—1 |

FOREIGN PATENTS

| 322,224 | 12/1929 | Great Britian. |
| 411,770 | 6/1945 | Italy. |

DAVID J. WILLIAMOWSKY, Primary Examiner.
DENNIS L. TAYLOR, Examiner.